Feb. 12, 1952 T. E. BOYLE 2,585,219
ANTISKID COMPOSITION AND METHOD OF MAKING SAME
Filed Aug. 24, 1949

Inventor
Thomas E. Boyle
By Robert W. Furlong
Atty

Patented Feb. 12, 1952

2,585,219

UNITED STATES PATENT OFFICE 2,585,219

ANTISKID COMPOSITION AND METHOD OF MAKING SAME

Thomas E. Boyle, Auckland, Auckland, New Zealand, assignor to The B. F. Goodrich Company, New York, N. Y., a corporation of New York Application August 24, 1949, Serial No. 112,065

19 Claims. (Cl. 152—21)

This invention relates to a skid-resistant rubbery composition and has particular reference to a rubbery tire whose tread surface is made thereof.

It is an object of this invention to provide an improved skid-resistant rubbery composition.

It is also an object of my invention to provide a vulcanized rubbery skid-resistant tire tread which has improved tread wear characteristics.

Another object of my invention is to provide a method of making a tread composition which has improved traction on ice and snow coated surfaces.

Other objects of my invention will be apparent from the drawings and description which follow.

Rubbery compositions generally employed in tire treads have very poor traction characteristics on surfaces that are wet or coated with ice or snow. Attempts have been made to overcome this situation by the addition of a coarse particulate material into the rubbery composition, but while the traction of the rubbery composition is increased the wear characteristics are greatly decreased.

My invention embodies the use of a mixture of ground or crushed nut shells and oat hulls in the rubbery composition. My composition shows not only greatly improved traction on wet surfaces or those covered with ice and snow, when compared with known anti-skid compositions, but has greatly improved wear resistance.

The ground of crushed nut shells, as used in my invention, are relatively hard and brittle. Preferably nut shells having a durometer "D" hardness of from 65 to 100 points are used. Walnut shells that have been broken into relatively small fragments, as by a crushing or grinding operation, are particularly satisfactory as the nut shell ingredient and have a durometer "D" hardness of approximately 80. It is preferable that the nut shell particles be substantially of a size that will pass through a U. S. Standard Sieve Series No. 10 screen but will be retained on a U. S. Standard Sieve Series No. 35 screen. However, any screening operation generally allows a trace of particles which should pass through a U. S. Standard Sieve Series No. 35 screen to remain with the larger particles.

Oat hulls, as used in my invention, refer to the chaff or husk surrounding the oat kernel which is generally removed from the kernel by a threshing process. The oat hulls do not require any special preparation to render them satisfactory for use in my invention, the condition in which they exist after threshing the oat hulls from the oat kernels being satisfactory. It is preferable to use oat hulls of a size which pass through a U. S. Standard Sieve Series No. 14 screen but which are retained on a U. S. Standard Sieve Series No. 60 screen.

Throughout the description, reference is made to an elastomeric tire tread embodying my invention and using crushed or ground walnut shells as the nut shell ingredient. However, it must be understood that this embodiment is intended only as an illustration, and I do not intend to limit this invention to this type of article, but contemplate its use in the tread surfaces of other articles in which somewhat the same problem occurs, such as shoe soles, stair treads, floor mats or coverings, and the like.

Figure 1:
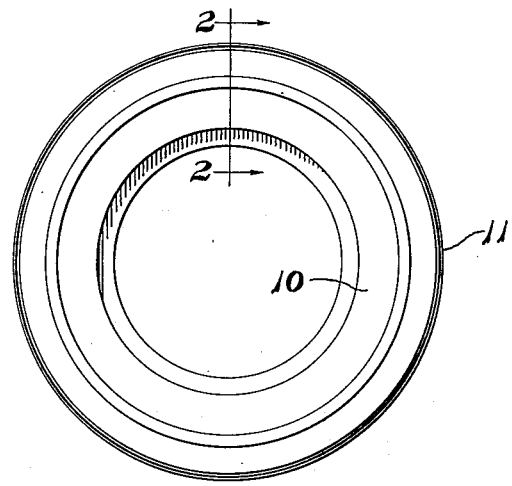
Fig. 1 is a view in elevation of a tire embodying my invention.
Figure 2:
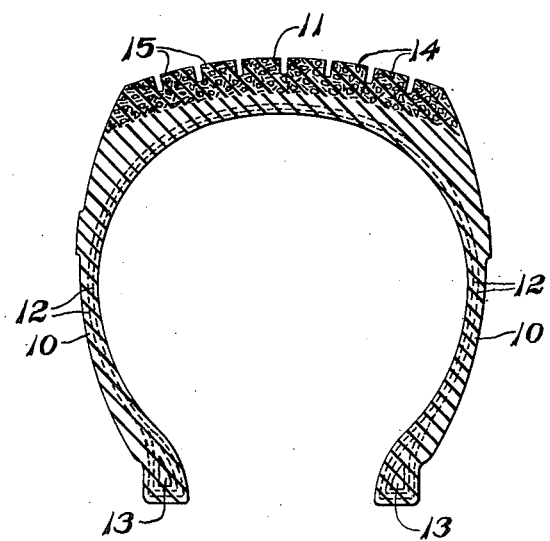
Fig. 2 is a section on line 2—2 of Fig. 1.
Figure 3:
Fig. 3 represents ground walnut shells as embodied in my invention.
Figure 4:
Fig. 4 represents oat hulls as embodied in my invention.

Referring to the drawings, the tire comprises a tire carcass 10 and a tire tread 11 which adheres to the circumferential portion of the carcass 10. The carcass 10 is composed of plies 12, 12 of fabric cord coated or impregnated with rubbery material. The tire ist held securely to the wheel rim by beads 13, 13. Dispersed throughout tire tread 11 are crushed walnut shells 14, 14 and oat hulls 15, 15.

The addition of a mixture of crushed walnut shells and oat hulls to the tread composition imparts to a tire having this tread a greatly increased coefficient of friction on a wet surface or one coated with ice and/or snow. This allows a vehicle using this type of tire to obtain improved traction permitting it to more readily overcome inertia when the adverse weather conditions mentioned above prevail. Furthermore, a vehicle using such tires has less tendency to skid from a desired course, when such vehicle is accelerated or retarded.

Although the reasons for the success of my invention are not clearly understood and I do not wish to be limited by any explanation that may be offered, it seems very probable that the crushed walnut shell particles 14, 14 embedded in the rubbery composition having very irregular surfaces cut into the ice and snow covering the surfaces on which the vehicle moves and act as an abrasive against this surface developing increased frictional properties and the oat hulls 15, 15, while they probably do not cut through the ice, greatly increase the frictional characteristics of the tread 11 and become effective as the walnut shell particles 14, 14 cut through the ice coating. In any event, it is clear that the combination of the action of these two ingredients in the tread composition is responsible for the greatly increased anti-skid characteristics of a tire tread embodying this invention.

While a mixture of crushed or ground nut shells and oat hulls in any proportion will give a beneficial anti-skid effect when compounded into a tire tread, it is preferable to use a mixture containing from 35 to 65 percent by weight of nut shell fragments and the remainder oat hulls to obtain optimum results.

The elastomeric material of the tread composition may be either natural rubber which is essentially a rubbery polymer of isoprene, such as caoutchouc and the like; or synthetic rubber, such as the rubbery polymers of open-chain conjugated diolefins having from four to eight carbon atoms exemplified by butadiene-1,3; 1,4-dimethyl butadiene-1,3; 2,3-dimethyl butadiene-1,3; isoprene, and the like, or the rubbery copolymers of these and similar monomeric materials with each other or with such copolymerizable monomeric ethylenic materials as isobutylene, methyl acrylate, ethyl acrylate, methyl methacrylate, ethyl methacrylate, styrene, 2-vinyl pyridine, acrylonitrile and similar materials, or chloroprene rubbers. Fillers, softeners, accelerators, antioxidants, etc. may be added to the tread composition to impart desired properties.

I have found that the optimum proportion of crushed or ground nut shell oat hull mixture that may be used is from 25 to 55 parts by weight based on 100 parts by weight of the elastomeric material. If a greater amount of the mixture is added, the tread composition will be very inelastic and give poor wear. If a lesser amount is used, the desired degree of traction will not be obtained.

The following examples embodying my invention are cited merely as illustrations, and I do not intend to limit the scope of my invention by these examples.

*Example 1*

A typical example of a tread composition using natural rubber as the elastomeric material is as follows:

| Material: | Parts by weight |
|---|---|
| Natural rubber | 100.0 |
| Crushed walnut shells | 25.0 |
| Oat hulls | 20.0 |
| Carbon black | 30.0 |
| Stearic acid | 2.5 |
| Sulfur | 3.4 |
| Zinc oxide | 2.9 |
| Accelerator | 1.2 |
| Antioxidant | 1.0 |
| Softener | 2.2 |
| Total | 188.2 |

The elastomeric material is "broken down" on a mill and the sulfur, walnut shells, oat hulls, reinforcing materials, accelerators, softeners, etc. are uniformly dispersed therein in any accepted manner. However, it is preferable to add the crushed walnut shells and oat hulls in the latter stages of the mix. The composition is formed generally by an extrusion process into a tread contour and a tire is assembled and vulcanized in a mold at 280° F. for a period of 45 minutes.

*Example 2*

A typical example of a tread composition using a synthetic rubber as the elastomeric material is as follows:

| Material: | Parts by weight |
|---|---|
| Rubbery butadiene-styrene copolymer (GR–S) (72% conversion) | 100.0 |
| Crushed walnut shells | 20.0 |
| Oat hulls | 25.0 |
| Carbon black | 30.0 |
| Stearic acid | 3.0 |
| Sulfur | 3.2 |
| Zinc oxide | 3.3 |
| Accelerator | 1.0 |
| Antioxidant | 1.4 |
| Softener | 1.9 |
| Total | 1' |

Mixing and vulcanization may be carried out as in Example 1.

*Example 3*

A typical example of a tread composition using a blend of synthetic rubber and natural rubber as the elastomeric material is as follows:

| Material: | Parts by weight |
|---|---|
| Natural rubber | 70.0 |
| Rubbery butadiene-styrene copolymer (GR–S) (72% conversion) | 30.0 |
| Crushed walnut shells | 25.0 |
| Oat hulls | 25.0 |
| Carbon black | 35.0 |
| Sulfur | 4.1 |
| Zinc oxide | 4.2 |
| Accelerator | 0.7 |
| Antioxidant | 1.7 |
| Softener | 1.5 |
| Total | 197.2 |

Mixing and vulcanization may be carried out as in Example 1.

Tire treads made as described above have greatly improved traction characteristics, when compared with known anti-skid treads and also have greatly improved wear resistance.

Comparative tests were made on tires embodying my invention and on tires embodying known anti-skid tread compositions using a standard conventional tire tread without anti-skid ingredients as a basis for evaluating the results. The evaluations are set forth as an indices measurement with the standard conventional tire tread having an index of 100.

Traction measurements of acceleration and retardation were conducted on an ice coated surface with the following results being obtained:

| Type Tread | Traction Index | |
|---|---|---|
| | Acceleration | Retardation |
| Standard rubbery butadiene-styrene copolymer (GR-S) (72% conversion) | 100 | 100 |
| Known rubbery butadiene-styrene copolymer (GR-S) anti-skid (72% conversion) | 170 | 111 |
| Rubbery butadiene-styrene copolymer (GR-S) embodying my invention (72% conversion) | 180 | 136 |

The tread compositions used above contain the same quantity of each ingredient except for the anti-skid material added. The treads containing anti-skid material have the optimum amount of anti-skid material added.

Tread wear characteristics were tested on Texas roads and the results are evaluated as an indices evaluation with an index of 100 as a standard and an increase in index representing increasing tread wear. The results of these tests are as follows:

| Type Tread | Tread Wear Characteristics |
| --- | --- |
| Standard butadiene-styrene copolymer (GR-S) (72% conversion) | 100 |
| Rubbery butadiene-styrene copolymer (GR-S) embodying my invention (72% conversion) | 71 |
| Known rubbery butadiene-styrene copolymer (GR-S) anti-skid tread (72% conversion) | 53 |

Crushed walnut shells, if used solely as the anti-skid ingredient in the tread composition, increase the traction property of the tread slightly over a standard conventional tread composition, but the increase in traction characteristics is much less than when a mixture of crushed walnut shells and oat hulls is used as the anti-skid ingredient. Oat hulls as the sole anti-skid ingredient of the tread composition act similarly to crushed walnut shells in that the traction properties are improved somewhat, but do not show the vast improvement which a mixture of the two as described above exhibits.

It is clear that obvious variations may be made without departing from the scope and spirit of my invention as defined in the appended claims.

I claim:

1. A vulcanized elastomeric tread composition comprising 100 parts by weight of a vulcanized rubbery conjugated diene polymer and from 25 to 55 parts by weight of a mixture of nut shell particles having a durometer "D" hardness of from 65 to 100 points and oat hulls, said mixture consisting essentially of from 35 to 65 percent by weight of nut shell particles and from 65 to 35 percent by weight of oat hulls, said nut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

2. A vulcanizable elastomeric tire tread comprising 100 parts by weight of a vulcanizable rubbery conjugated diene polymer and from 25 to 55 parts by weight of a mixture of walnut shell particles and oat hulls, said mixture consisting of from 35 to 65 percent by weight of walnut shell particles and from 65 to 35 percent by weight of oat hulls, said walnut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

3. A vulcanizable elastomeric tire tread comprising 100 parts by weight of a vulcanizable rubbery conjugated diene polymer and from 25 to 55 parts by weight of a mixture of nut shell particles having a durometer "D" hardness of from 65 to 100 points and oat hulls, said mixture consisting of from 35 to 65 percent by weight of nut shell particles and from 65 to 35 percent by weight of oat hulls, said nut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

4. A vulcanizable elastomeric tire tread comprising 100 parts by weight of a vulcanizable natural rubber and from 25 to 55 parts by weight of a mixture of nut shell particles having a durometer "D" hardness of from 65 to 100 points and oat hulls, said mixture consisting of from 35 to 65 percent by weight of nut shell particles and from 65 to 35 percent by weight of oat hulls, said nut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

5. A vulcanizable elastomeric tire tread comprising 100 parts by weight of a vulcanizable rubbery butadiene-styrene copolymer and from 25 to 55 parts by weight of a mixture of nut shell particles having a durometer "D" hardness of from 65 to 100 points and oat hulls, said mixture consisting of from 35 to 65 percent by weight of nut shell particles and from 65 to 35 percent by weight of oat hulls, said nut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

6. A vulcanizable elastomeric tire tread comprising 100 parts by weight of a vulcanizable blend of natural rubber and a rubbery butadiene-styrene copolymer and from 25 to 55 parts by weight of a mixture of nut shell particles having a durometer "D" hardness of from 65 to 100 points and oat hulls, said mixture consisting of from 35 to 65 percent by weight of nut shell particles and from 65 to 35 percent by weight of oat hulls, said nut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

7. The method of making a vulcanized tire having an anti-skid tread composition comprising dispersing uniformly into 100 parts by weight of a vulcanizable rubbery conjugated diene polymer tread composition from 25 to 55 parts by weight of a mixture consisting of 35 to 65% by weight of nut shell particles having a durometer "D" hardness of from 65 to 100 points and 65 to 35% by weight of oat hulls, said nut shell particles consisting essentially of a size which passes through a U. S. Standard Sieve Series No. 10 screen but is retained on a U. S. Standard Sieve Series No. 35 screen and said oat hulls consisting essentially of a size which passes through a U. S. Standard Sieve Series No. 14 screen but is retained on a U. S. Standard Sieve Series No. 60 screen, assembling said tread composition into a tire, and vulcanizing the tire.

8. A vulcanized tire having a tread composition comprising 100 parts by weight of a vulcanized rubbery conjugated diene polymer and from 25 to 55 parts by weight of a mixture of nut shell particles having a durometer "D" hardness of from 65 to 100 points and oat hulls, said mixture consisting of from 35 to 65 percent by weight of said nut shell particles and from 65 to 35 percent by weight of said oat hulls, said nut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

9. A vulcanized tire having a tread composition comprising 100 parts by weight of a vulcanized rubbery conjugated diene polymer and from 25 to 55 parts by weight of a mixture of walnut shell particles and oat hulls, said mixture consisting of from 35 to 65 percent by weight of said walnut shell particles and from 65 to 35 percent by weight of said oat hulls, said walnut shell particles consisting substantially of a size which passes through a U. S. Standard Sieve Series No. 10 screen but is retained on a U. S. Standard Sieve Series No. 35 screen and said oat hulls consisting substantially of a size which passes through U. S. Standard Sieve Series No. 14 screen but is retained on a U. S. Standard Sieve Series No. 60 screen.

10. A vulcanized elastomeric tread composition comprising 100 parts by weight of a vulcanized rubbery conjugated diene polymer and from 25 to 55 parts by weight of a mixture of walnut shell particles and oat hulls, said mixture consisting essentially of from 35 to 65 per cent by weight of walnut shell particles and from 65 to 35 percent by weight of oat hulls, said walnut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

11. A vulcanized elastomeric tread composition comprising 100 parts by weight of a vulcanized rubbery butadiene-styrene copolymer and from 25 to 55 parts by weight of a mixture of nut shell particles having a durometer "D" hardness of from 65 to 100 points and oat hulls, said mixture consisting essentially of from 35 to 65 percent by weight of nut shell particles and from 65 to 35 percent by weight of oat hulls, said nut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

12. A vulcanized elastomeric tread composition comprising 100 parts by weight of a vulcanized rubbery butadiene-styrene copolymer and from 25 to 55 parts by weight of a mixture of walnut shell particles and oat hulls, said mixture consisting essentially of from 35 to 65 per cent by weight of walnut shell particles and from 65 to 35 percent by weight of oat hulls, said walnut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

13. A vulcanizable elastomeric tire tread comprising 100 parts by weight of a vulcanizable rubbery butadiene-styrene copolymer and from 25 to 55 parts by weight of a mixture of walnut shell particles and oat hulls, said mixture consisting essentially of from 35 to 65 percent by weight of walnut shell particles and from 65 to 35 percent by weight of oat hulls, said walnut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

14. A vulcanizable elastomeric tire tread comprising 100 parts by weight of a vulcanizable blend of natural rubber and a rubbery butadiene-styrene copolymer and from 25 to 55 parts by weight of a mixture of walnut shell particles and oat hulls, said mixture consisting essentially of from 35 to 65 percent by weight of walnut shell particles and from 65 to 35 percent by weight of oat hulls, said walnut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

15. A vulcanized tire having a tread composition comprising 100 parts by weight of a vulcanized rubbery butadiene-styrene copolymer and from 25 to 55 parts by weight of a mixture of walnut shell particles and oat hulls, said mixture consisting of from 35 to 65 percent by weight of said walnut shell particles and from 65 to 35 percent by weight of said oat hulls, said walnut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

16. A vulcanized tire having a tread composition comprising 100 parts by weight of a vulcanized blend of natural rubber and a rubbery butadiene-styrene copolymer and from 25 to 55 parts by weight of a mixture of walnut shell particles and oat hulls, said mixture consisting of from 35 to 65 percent by weight of said walnut shell particles and from 65 to 35 percent by weight of said oat hulls, said walnut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

17. A vulcanized tire having a tread composition comprising 100 parts by weight of a vulcanized natural rubber and from 25 to 55 parts by weight of a mixture of nut shell particles having a durometer "D" hardness of from 65 to 100 points and oat hulls, said mixture consisting of from 35 to 65 percent by weight of nut shell particles and from 65 to 35 percent by weight of oat hulls, said nut shell particles consisting substantially of a size which passes through a U. S. Standard Sieve Series No. 10 screen but is retained on a U. S. Standard Sieve Series No. 35 screen and said oat hulls consisting substantially of a size which passes through a U. S. Standard Sieve Series No. 14 screen but is retained on a U. S. Standard Sieve Series No. 60 screen.

18. The method of making a vulcanized tire having an anti-skid tread composition comprising dispersing uniformly into 100 parts by weight of a vulcanizable rubbery conjugated diene polymer tread composition from 25 to 55 parts by weight of a mixture consisting of 35 to 65 percent by weight of walnut shell particles and 65 to 35 percent by weight of oat hulls, said walnut shell particles consisting essentially of a size which passes through a U. S. Standard Sieve Series No. 10 screen but is retained on a U. S. Standard Sieve Series No. 35 screen and said oat hulls consisting essentially of a size which passes through a U. S. Standard Sieve Series No. 14 screen but is retained on a U. S. Standard Sieve Series No. 60 screen, assembling said tread composition into a tire, and vulcanizing the tire.

19. The method of making a vulcanizable anti-skid tread composition comprising providing a vulcanizable rubbery conjugated diene polymer tread composition and dispersing uniformly into every 100 parts by weight of said rubbery conjugated diene polymer from 25 to 55 parts by weight of a mixture consisting of 35 to 65 percent by weight of nut shell particles having a durometer "D" hardness of from 65 to 100 points and 65 to 35 percent by weight of oat hulls, said nut shell particles consisting essentially of a size which passes through a U. S. Standard Sieve Series No. 10 screen but is retained on a U. S. Standard Sieve Series No. 35 screen and said oat hulls consisting essentially of a size which passes through a U. S. Standard Sieve Series No. 14 screen but is retained on a U. S. Standard Sieve Series No. 60 screen.

THOMAS E. BOYLE.

REFERENCES CITED

The following references are of record in the file of this patent:

UNITED STATES PATENTS

| Number | Name | Date |
| --- | --- | --- |
| 1,950,621 | Morse | Mar. 13, 1934 |
| 2,041,217 | Smithers | May 19, 1936 |
| 2,373,698 | McGeary | Apr. 17, 1945 |
| 2,414,803 | D'Alelio | Jan. 28, 1947 |
| 2,434,207 | Gapen | Jan. 6, 1948 |

OTHER REFERENCES

India Rubber World, July 1948, page 543.